United States Patent [19]
Schlegelmann et al.

[11] Patent Number: 5,620,388
[45] Date of Patent: Apr. 15, 1997

[54] AXLE AXIAL MOTION LIMITING DEVICE FOR A ROTATING COMPONENT SHAFT POSITION ADJUSTMENT

[75] Inventors: Joseph B. Schlegelmann, Marcette; William D. Baedke, Romeo; Michael M. Start, Utica, all of Mich.

[73] Assignee: Ford Motor Company, Dearborn, Mich.

[21] Appl. No.: 398,275

[22] Filed: Mar. 3, 1995

[51] Int. Cl.⁶ .................................................. F16H 48/00
[52] U.S. Cl. ........................... 475/230; 475/346; 74/607; 403/315
[58] Field of Search ..................... 475/230, 331, 475/346; 74/607; 403/315, 316

[56] References Cited

U.S. PATENT DOCUMENTS

| | | | |
|---|---|---|---|
| 1,115,536 | 11/1914 | Hinkley | 475/230 |
| 1,508,832 | 9/1924 | Zimmerschied et al. | 475/230 |
| 3,527,120 | 9/1970 | Duer et al. | 475/230 X |
| 3,624,717 | 11/1971 | Brubaker | 475/230 X |
| 3,628,399 | 12/1971 | Seitz et al. | 475/230 X |
| 3,770,994 | 11/1973 | Smith . | |
| 3,831,462 | 8/1974 | Baremor . | |
| 3,853,022 | 12/1974 | Duer | 475/230 |
| 4,096,712 | 6/1978 | Webb . | |
| 4,304,317 | 12/1981 | Vanzant et al. . | |
| 4,332,304 | 6/1982 | Barnow . | |
| 4,492,018 | 1/1985 | Rode . | |
| 4,509,931 | 4/1985 | Lambert et al. . | |
| 4,569,250 | 2/1986 | Nellums . | |
| 4,598,609 | 7/1986 | Nellums et al. . | |
| 4,611,935 | 9/1986 | Rode . | |
| 4,754,661 | 7/1988 | Barnett . | |
| 5,102,378 | 4/1992 | Gobert . | |
| 5,131,894 | 7/1992 | Hilker | 475/230 |
| 5,316,106 | 5/1994 | Baedke et al. . | |

OTHER PUBLICATIONS

Car Shop Manual, 1989, Ford Parts and Service Div., Publication Department, Axle, Integral Carrier, 8.8 Inch Ring Gear, pp. 15–06–1 to 15–06–4.

*Primary Examiner*—Charles A. Marmor
*Assistant Examiner*—Mary Ann Battista
*Attorney, Agent, or Firm*—Frank G. McKenzie

[57] ABSTRACT

In a differential/mechanism for transmitting power from a drive shaft to the axle shafts of a motor vehicle, a shim cap surrounding the end of the axle shaft is located between a differential pinion shaft and a slotted washer seated within recesses formed on the axle shaft and on the side bevel gear, the shim cap having a crown whose thickness fills the axial space between the inner end of the axle shaft and the pinion shaft. The shim cap limits the range of axially inward movement of the axle shaft.

4 Claims, 3 Drawing Sheets

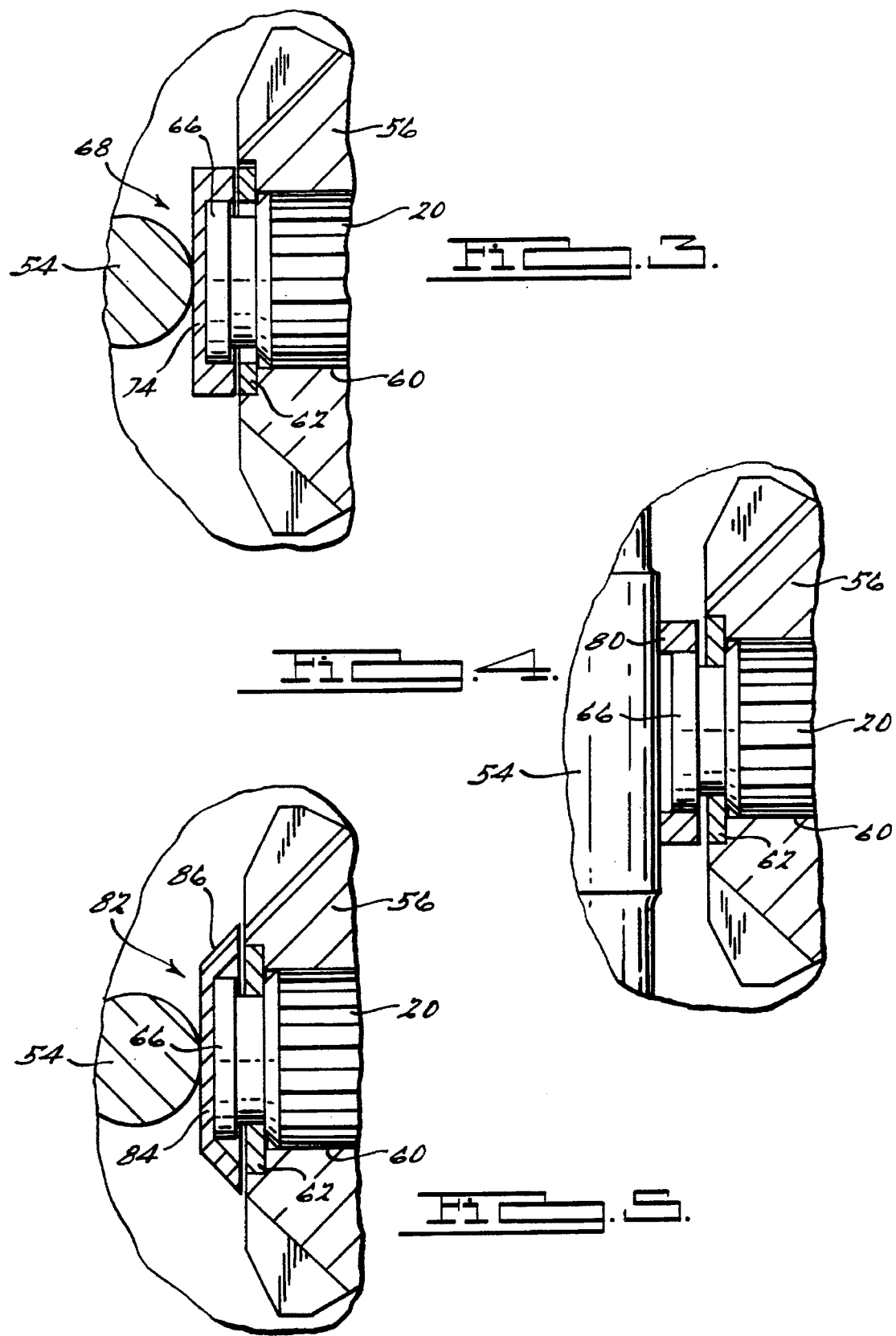

5,620,388

AXLE AXIAL MOTION LIMITING DEVICE FOR A ROTATING COMPONENT SHAFT POSITION ADJUSTMENT

BACKGROUND OF THE INVENTION

1. Field of the Invention

This invention pertains to the field of drivelines for motor vehicles. More particularly, the invention pertains to axle shafts driven from a differential mechanism.

2. Description of the Prior Art

In conventional drivelines, particularly those for rear wheel drive vehicles, the left-hand and right-hand axle shafts extend laterally from a differential mechanism that includes side bevel gears in continuous meshing engagement with differential pinions supported rotatably on a pinion shaft carried on a differential carrier, which is driven rotatably by a set of meshing bevel gears, one of which is driven by a drive shaft disposed substantially perpendicular to the axle shafts. The side bevel gears typically are connected rotatably to the axle shafts by a spline connection formed on a shoulder near the inboard ends of the axle shafts. Each axle shaft carries another shoulder at its axially innermost extremity, the second shoulder located adjacent the differential pinion shaft.

Located between the shoulders on the axle shaft is a recess that is axially aligned with the recess formed on the corresponding side bevel gear. A slotted washer, fitted within the recesses of the axle shaft and side bevel gear, limits outward axial movement of the axle shaft relative to the side bevel gear. However, because the recess formed on each bevel gear that receives the slotted washer is open at its axially inner surface, each axle shaft is free to move along the spline connection axially inward toward the differential pinion shaft.

SUMMARY OF THE INVENTION

In a conventional design, space is provided between the axially innermost surface of each axle shaft and the differential pinion shaft. It is an object of the present invention to provide means for limiting displacement of an axle shaft in both axial directions.

A device, according to the present invention, for limiting axial displacement of an axle shaft in a differential mechanism includes a shaft supported for rotation about a longitudinal axis, having a first recess located near an axial end of the shaft; a first component supported for axial displacement with respect to the shaft, having a second recess; a washer supported on the shaft, partially located in the first recess and partially located into the second recess, abutting the first component and the shaft; a second component located adjacent the inner end of the shaft, fixed against axial displacement; a shim surrounding the shaft, located between the washer and the second component, the second component and shim adapted for mutual contact.

BRIEF DESCRIPTION OF THE DRAWINGS

FIG. 3 is a cross section through the centerline of an axle shaft showing one form of the invention.

FIG. 4 is a cross section through an axle shaft showing a second embodiment of the invention.

FIG. 5 is a cross section through the centerline of an axle shaft showing a third embodiment of the invention.

DESCRIPTION OF THE PREFERRED EMBODIMENT

Figure 1:
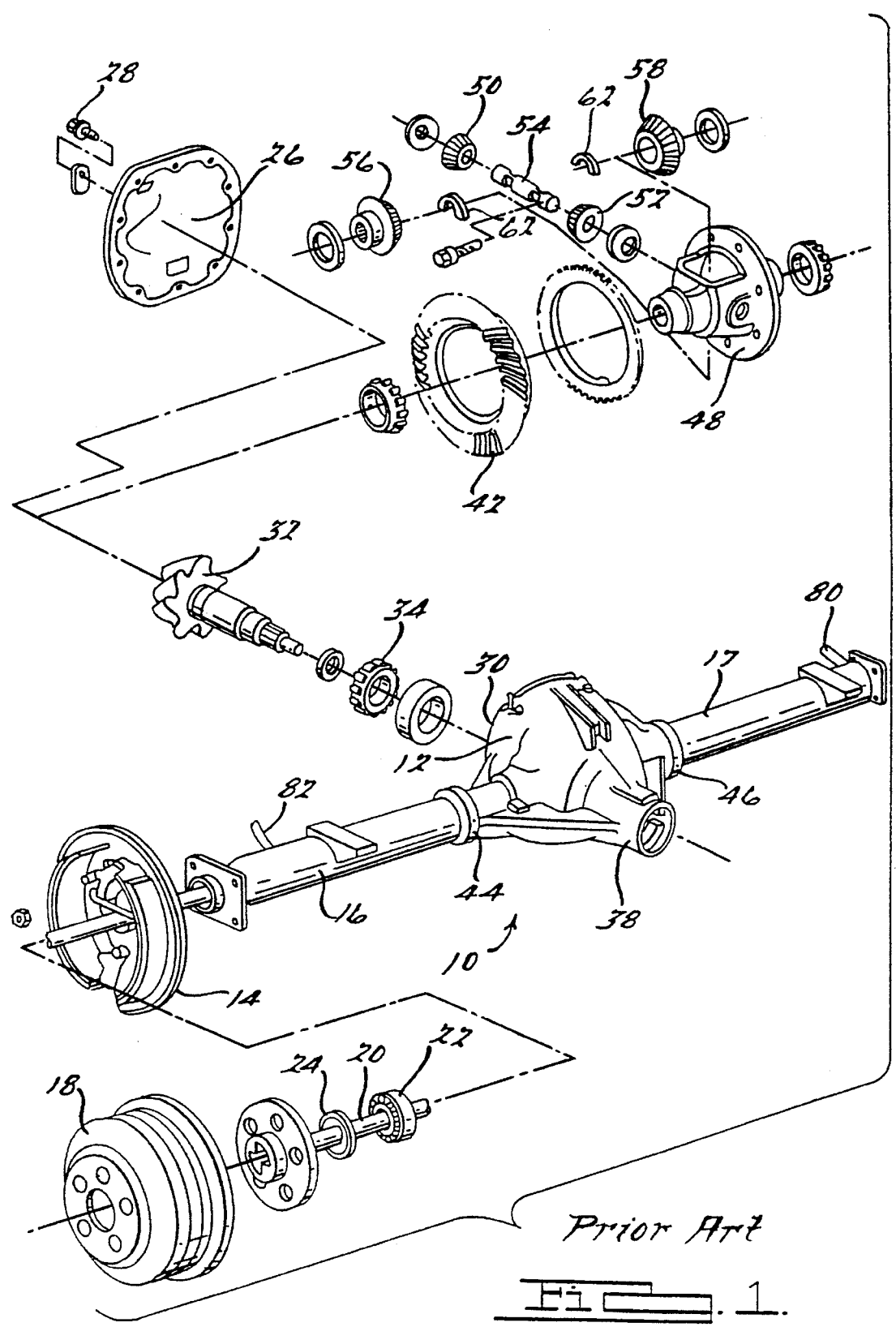
FIG. 1 is a perspective view looking rearward toward an axle differential assembly.
Figure 2:
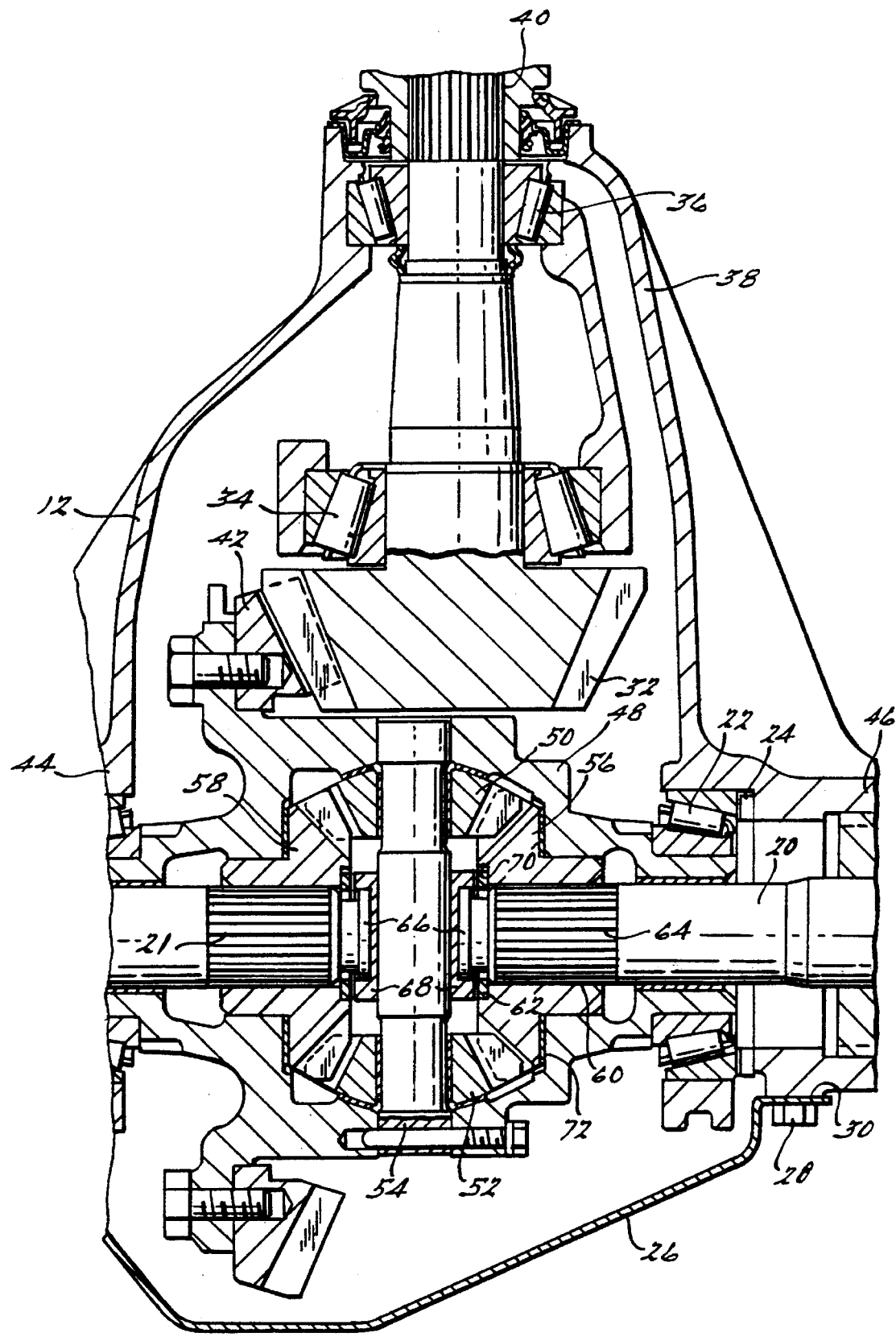
FIG. 2 is a cross section through the differential axle assembly of FIG. 1.

Referring first to FIG. 1, an axle assembly, to which the present invention can be applied, includes axle housing 12, which contains a differential mechanism and a reservoir of hydraulic lubricant; brake assembly 14 located at the end of a tube 16 extending outboard from the ends of the axle housing 12; brake drum 18; axle shaft assembly 20; axle shaft bearing 22; and bearing seal 24.

A cover 26 is connected by bolts 28 to the rear face 30 of the housing 12 hydraulically seals the housing against the passage of lubricant.

Located within the differential case is a drive pinion 32 rotatably supported by a rear drive pinion bearing 34 and a front drive pinion bearing 36 supported on the inner surface of a portion of the axle carrier casing 38 that extends forward from the center line of the axle assembly. A driveshaft, driveably connected to the output shaft of a transmission, is connected through spline 40 to the shaft that drive pinion 32.

The differential mechanism, located within the differential case, includes a ring gear 42, in continuous meshing engagement with drive pinion 32 and supported rotatably on differential rear drive pinion bearing 34 and front drive pinion bearing 36 located within the housing gear and cylindrical extension 38 of the housing assembly 12.

The axle carrier assembly 12 also includes laterally directed tubular extensions 44, 46, which receive therein the ends of housing tubes 16 and 17, respectively. Located within the axle assembly 12 is a differential carrier 48, on which bevel pinion gears 50, 52 are supported for rotation on a differential pinion shaft 54. Side bevel gears 56, 58 are in continuous meshing engagement with pinions 50, 52 and are driveably connected to left and right axle shafts 20 and 21, located respectively within tubes 16 and 17.

Axle shaft 20 is connected by a spline 60 to the corresponding side bevel gear 56. A slotted washer 62, such as that shown in FIGS. 2–5, is fitted within a recess formed on the axle shaft 20 located between a shoulder 64, on which the external spline 60 is formed, and a terminal shoulder 66 located at the end of the axle shaft. A shim cap 68 surrounds shoulder 66 and is located between differential pinion shaft 54 and washer 62, which is located partially within a recess 70 formed on the radially inner surface of side pinion gear 56 and partially within the shaft recess. A thrust washer 72 is located in the annular space between carrier 48, which is fixed against axial displacement, and bevel gear 56, thereby limiting outward axial displacement of the gear.

Referring now to FIG. 3, shim 68 has a rim located adjacent washer 62 and a crown 74 occupying the annular space within the rim and having a thickness sufficient to occupy the clearance between the outer surface of differential pinion shaft 54 and shoulder 66. The thickness of the crown 74 forces axle shaft 20 axially outward from the differential mechanism such that washer 62 contacts the axial face of recess 70 formed on side bevel gear 56. This movement may produce a small gap between the inner axial face of washer 62 and the outer axial face of the rim portion of the shim cap 68, but any gap that exists between the rim and washer is smaller than the axial clearance between the inner axial end of recess 70 and the outer axial face of washer 62. For this reason, it is impossible for washer 62 to drop out of the recess located between shoulders 64 and 66.

FIG. 4 shows an embodiment in which the shim is replaced by a retainer ring 80 encircling shoulder 66 on axle shaft 20, abutting shaft 54, and extending radially outwardly to completely overlap shoulder 66. The thickness of retaining ring 80, i.e., its axial dimension, is great enough to prevent washer 62 from falling out of the recess between shoulders 64 and 66 on the axle shaft and from the recess 70 formed in the side bevel gear 56.

FIG. 5 shows an alternate embodiment in which a shim cap 82 is formed by stamping sheet metal in the form of a crown 84 and an annular rim 86. The thickness of the sheet from which cap 82 is stamped may vary over a range sufficient so that it occupies the space between the end of shoulder 66 on the axle shaft 20 and the differential pinion shaft 54. In this way, axial end play of the axle shaft is substantially eliminated. Shim cap 82 forces axle shaft 20 axially outward so that slotted washer 62 is forced into contact with gear 56.

It is understood that although the form of the invention shown herein and described constitutes the preferred embodiment of the invention, it is not intended to illustrate all possible forms thereof. It will also be understood that words used are words of description rather than a limitation, and that various changes may be made without departing from the spirit and scope of the invention as disclosed.

We claim:

1. In a differential mechanism, a device for limiting the range of axial motion, comprising:

first and second mutually substantially aligned shafts, each supported for rotation about a longitudinal axis, having a first recess located near an end of the shaft;

first and second side bevel gears, the first gear rotatably fixed to the first shaft and supported for axial displacement with respect to the first shaft, the second gears rotatably fixed to the second shaft and supported for axial displacement with respect to the second shaft, each of said gears having a second recess;

a first washer supported on the first shaft, partially located in the first recess of the first shaft and partially located into the second recess of the first gear, abutting the first gear and the first shaft;

a second washer supported on the second shaft, partially located in the first recess of the second shaft and partially located into the second recess of the second gear, abutting the second gear and the second shaft;

a differential pinion shaft carrying bevel pinions in continuous meshing engagement with the first and second gears, located adjacent said ends of the first and second shafts, fixed against axial displacement;

a first shim surrounding the first shaft, located between the first washer and the differential pinion shaft, contacting the differential pinion shaft and the first washer; and a second shim surrounding the second shaft, located between the second washer and the differential pinion shaft, contacting the differential pinion shaft and the second washer.

2. The device of claim 1 wherein:

the first shim comprises a crown located between said end of the first shaft and the differential pinion shaft, and a rim fixed to the crown, having a surface located adjacent the first washer; and the second shim comprises a crown located between said end of the second shaft and the differential pinion shaft, and a rim fixed to said crown, having a surface located adjacent the second washer.

3. The device of claim 2 wherein the first and second shims are formed from thin sheets of substantially uniform thickness.

4. The device of claim 1 wherein:

the first shaft includes an axially directed spline surface;

the first gear includes a spline in meshing engagement with the spline surface of the first shaft for mutually rotatably fixing the first gear and the first shaft, the first gear being limited in displacement in a first axial direction along the first shaft, the second recess of the first gear substantially aligned axially with the first recess of the first shaft and surrounding the first recess of the first shaft;

the second shaft includes an axially directed spline surface; and the second gear includes a spline in meshing engagement with the spline surface of the second shaft and mutually rotatably fixing the second gear and the second shaft, the second gear being limited in displacement in a second direction opposite the first direction along the second shaft, the second recess of the second gear substantially aligned axially with the first recess of the second shaft and surrounding the first recess of the second shaft.

\* \* \* \* \*